(12) United States Patent
Levy

(10) Patent No.: US 7,882,089 B1
(45) Date of Patent: Feb. 1, 2011

(54) CACHING DATABASE INFORMATION

(75) Inventor: Philip Levy, Los Altos, CA (US)

(73) Assignee: Adobe Systems Incorporated, San Jose, CA (US)

(*) Notice: Subject to any disclaimer, the term of this patent is extended or adjusted under 35 U.S.C. 154(b) by 715 days.

(21) Appl. No.: 11/181,597

(22) Filed: Jul. 13, 2005

(51) Int. Cl.
 *G06F 7/00* (2006.01)
 *G06F 17/30* (2006.01)
 *G06F 15/167* (2006.01)

(52) U.S. Cl. .................. 707/705; 707/721; 707/755; 709/213

(58) Field of Classification Search .............. 707/205, 707/1, 2, 4, 705, 721, 755, 999.001, 999.002, 707/999.004, 999.009; 709/213, 216
See application file for complete search history.

(56) References Cited

U.S. PATENT DOCUMENTS

| | | | | |
|---|---|---|---|---|
| 5,452,447 A | * | 9/1995 | Nelson et al. ............... 707/205 |
| 5,682,514 A | * | 10/1997 | Yohe et al. ................. 711/118 |
| 5,737,749 A | * | 4/1998 | Patel et al. ................. 711/123 |
| 5,896,506 A | * | 4/1999 | Ali et al. .................... 709/213 |
| 6,041,390 A | * | 3/2000 | Liu et al. .................... 711/110 |
| 6,073,129 A | * | 6/2000 | Levine et al. .................. 707/4 |
| 6,374,241 B1 | * | 4/2002 | Lamburt et al. ................ 707/6 |
| 6,446,062 B1 | * | 9/2002 | Levine et al. ............... 707/690 |
| 2003/0061170 A1 | * | 3/2003 | Uzo ............................ 705/64 |
| 2003/0163285 A1 | * | 8/2003 | Nakamura et al. .......... 702/179 |
| 2004/0104097 A1 | * | 6/2004 | Ngee .......................... 194/210 |
| 2005/0097084 A1 | * | 5/2005 | Balmin et al. ................ 707/3 |

* cited by examiner

*Primary Examiner*—Vincent Boccio
(74) *Attorney, Agent, or Firm*—Robert C Kowert; Meyertons, Hood, Kivlin, Kowert & Goetzel, P.C.

(57) ABSTRACT

Embodiments for caching database information are disclosed. A query may specify a set of information to be retrieved from a database file. The database file may be parsed according to the query to retrieve the set of information. The query and the corresponding set of information retrieved from the database file may be stored in a cache file. The cache file may be searched for the query, which may enable the set of information to be retrieved from the cache file. Searching the cache file and retrieving the set of information from the cache file may be faster than searching the database file to retrieve the set of information. The cache file may be associated with a currency token which may indicate whether the cache file is current. The currency token may indicate whether the database file has been updated since being parsed according to the query.

39 Claims, 6 Drawing Sheets

CACHING DATABASE INFORMATION

FIELD

This application pertains to the field of digital information storage and retrieval, and more particularly, to the field of digital information databases.

BACKGROUND

Digital information database files, including files in semantic markup language formats, may be very large and may have varied structures. When specific information is needed from such a database file, it is usually necessary to parse and process the entire database file in order to locate and retrieve the specific information. Parsing and processing large files can be time consuming and may tax computer system resources. These factors may adversely effect software application performance, and may also adversely effect overall computer system performance.

BRIEF DESCRIPTION OF THE DRAWINGS

The claimed subject matter will be understood more fully from the detailed description given below and/or from the accompanying drawings of embodiments which should not be taken to limit claimed subject matter to the specific embodiments described, but are for explanation and understanding.

DETAILED DESCRIPTION

Figure 1:
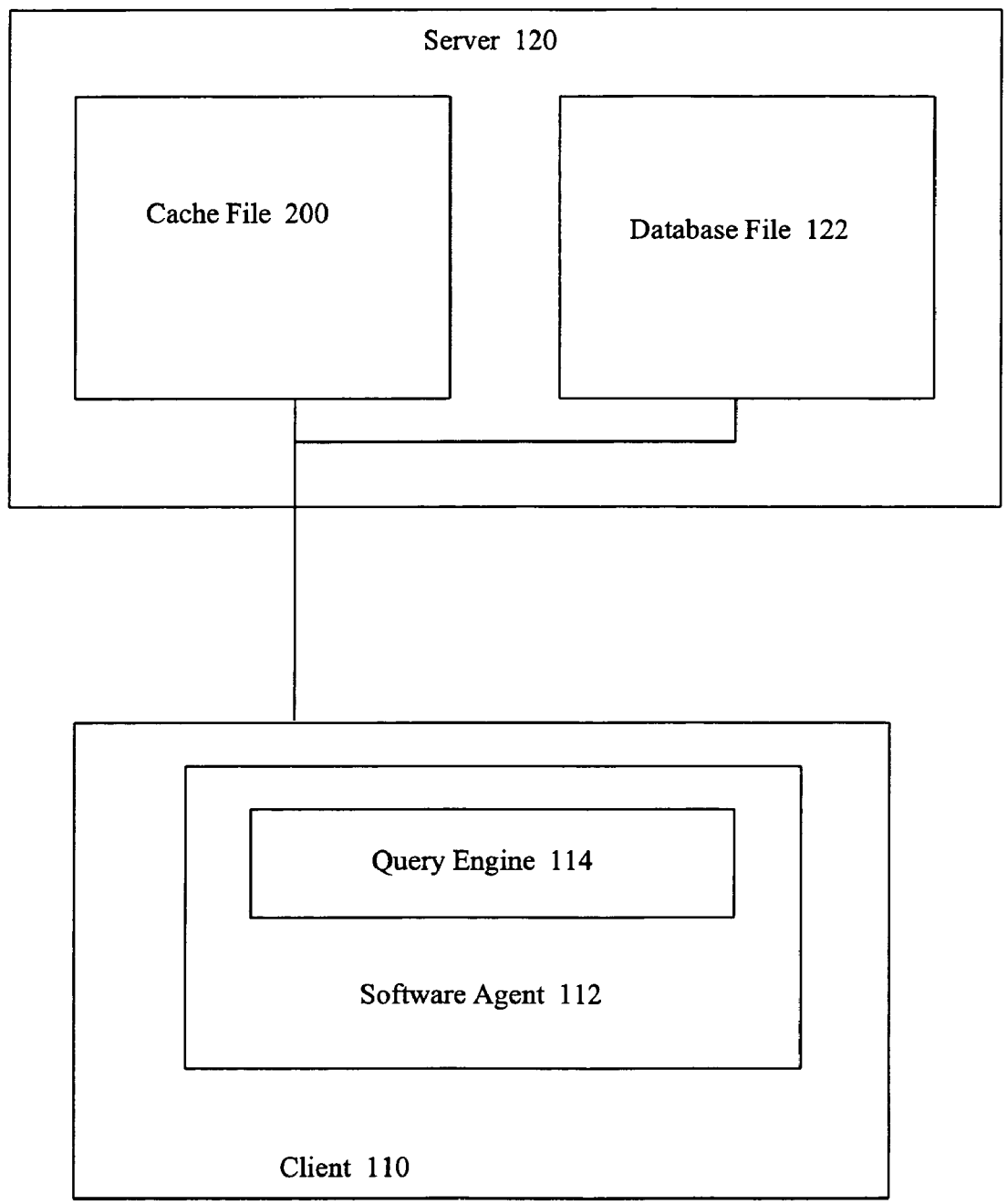
FIG. 1 is a block diagram of one embodiment of a client/server system where the server includes a database file and a cache file.

FIG. 1 is a block diagram of one embodiment of a client/server system where a server 120 includes a database file 122 and a cache file 200. A client 110 for this example includes a software agent 112. Software agent 112 includes a query engine 114. Database file 122 for this example includes digital information in the Extensible Markup Language (XML). XML is one example of a semantic markup language. Cache file 200 also includes digital information in XML. Cache file 200 may include a subset of the information stored in database file 122.

When software agent 112 desires to access information stored in database file 122, a set of information may be specified using a query expression. For this example embodiment, the query expression may be an XPath or XQuery expression, although the scope of the claimed subject matter is not limited in this respect. XPath and XQuery are standards promoted by the World Wide Web Consortium (W3C). XPath and/or XQuery expressions may be used to locate information within XML files. Query engine 114 may use) (Path and/or XQuery expressions to process and parse information within database file 122 and/or cache file 200.

In order to enhance the performance of software agent 112, whenever software agent 112 desires to access information specified by a query expression from database file 122, software agent 112 first checks to see if the specified information is stored in cache file 200. If the specified information is found in cache file 200, and if cache file 200 is current (the needed data is not invalid), then software agent 112 retrieves the specified information from cache file 200. Otherwise, software agent 112 retrieves the specified information from database file 122.

Although FIG. 1 depicts a software agent running on a client computer system and a cache file and a database file residing on a server computer system, other embodiments are possible where the software agent, cache file and database file reside on the same computer system. For one embodiment, the software agent and cache file may reside on a client system, and the database file may reside on a server system. Client and server systems may be coupled together via any interconnect, including, but not limited to, a local area network (LAN), the Internet, or a wireless interconnect. Further, although the embodiments described herein discuss computer systems, other embodiments may include software agents and/or cache files residing on any of a wide range of electronic devices, including, but not limited to, game consoles, personal digital assistants, cellular phones, etc.

Figure 2:
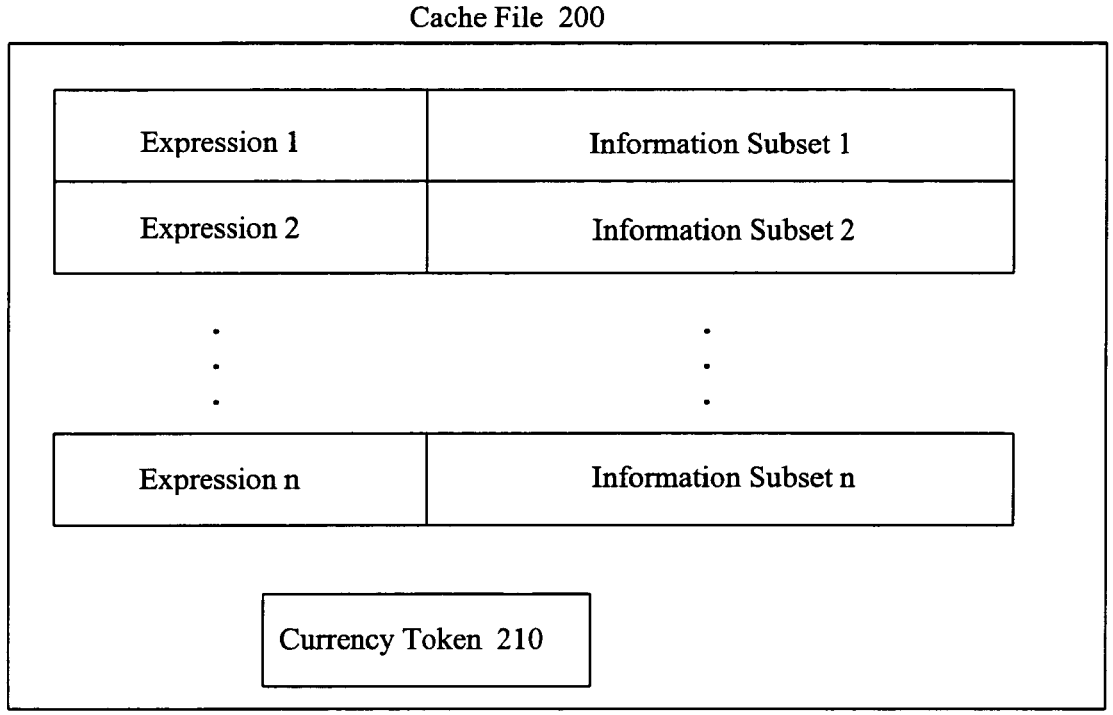
FIG. 2 is a block diagram of one embodiment of a cache file.

FIG. 2 is a block diagram of one embodiment of a cache file 200. For this example embodiment, cache file 200 includes a plurality of subsets of information (labeled Information Subsets 1 through n). Each subset of information is associated with a query expression that is also included in cache file 200. The query expressions are label Expression 1 through Expression n in FIG. 2. Cache file 200 also includes a currency token 210. A software agent such as software agent 112 may compare currency token 210 with an attribute of database file 122 or may compare token 210 with information stored in database file 122 in order to determine whether cache file 200 is current (valid). Currency token 210 for this example may comprise a time stamp, a checksum value associated with database file 122, a length value associated with database file 122, and/or a hash code value associated with database file 122.

When software agent 112 looks in cache file 200 to determine whether the information specified by a query expression is stored in the cache file, it compares the query expression that specifies the desired data with query expressions stored in cache file 200. If a match is found, then the subset of information associated with the matched expression is retrieved from cache file 200.

Expressions 1 through n for this example may comprise XPath and/or XQuery expressions. The related subsets of information may comprise XML data. The following is an example of information that may be included in database file 122. For this example the name of the database file is emp.xml. The example file emp.xml includes a listing of employees for a small company:

<?xml version="1.0" encoding="utf-8" standalone="yes" ?>
<employees>
<emp id="1">
<name>Jane Doe</name>
<ssn>111-11-1111</ssn>
<manager>mary</manager>
<hiredate>1994-11-16</hiredate>
</emp>
<emp id="2">
<name>John Smith</name>
<ssn>222-22-2222</ssn>

```
<manager>steve</manager>
<hiredate>1992-12-24</hiredate>
</emp>
<emp id="3">
<name>Terry Taylor</name>
<ssn>333-33-3333</ssn>
<manager>mary</manager>
<hiredate>1993-08-19<hiredate>
</emp>
<emp id="4">
<name>Alice Wilson</name>
<ssn>444-44-4444</ssn>
<manager>kim</manager>
<hiredate>1996-07-11</hiredate>
</emp>
<emp id="5">
<name>Mark Green</name>
<ssn>555-55-5555</ssn>
<manager>mary</manager>
<hiredate>1990-01-01</hiredate>
</emp>
</employees>
```

Also for this example, assume that cache file 200 includes an entry where the expression comprises a string "doc ("emp.xml")/employees/emp[manager='mary']" and the associated information subset comprises the following information:

```
<?xml version="1.0" encoding="UTF-8"?>
<emp id="1">
    <name>Jane Doe</name>
    <ssn>111-11-1111</ssn>
    <manager>mary</manager>
    <hiredate>1994-11-16</hiredate>
</emp>
<?xml version="1.0" encoding="UTF-8"?>
<emp id="3">
    <name>Terry Taylor</name>
    <ssn>333-33-3333</ssn>
    <manager>mary</manager>
    <hiredate>1993-08-19</hiredate>
</emp>
<?xml version="1.0" encoding="UTF-8"?>
<emp id="5">
    <name>Mark Green</name>
    <ssn>555-55-5555</ssn>
    <manager>mary</manager>
    <hiredate>1990-01-01</hiredate>
</emp>
</emp>
```

Further for this example, assume that a user of software agent 112 wishes to have a list of all employees who are managed by Mary. A query "doc("emp.xml")/employees/emp[manager-='mary']" may be generated. The software agent may first check cache file 200 to determine whether cache file 200 includes the desired information. This may be accomplished by comparing the generated expression with the expressions stored in the cache file. For this example, a match is found and the desired information is returned to software agent 112. If a match had not been found, then software agent 112 would have processed the entire emp.xml file according to the generated query in order to retrieve the desired information. Because the desired information for this example is found in cache file 200, software agent 112 may retrieve the information without processing and/or parsing the emp.xml file, and the performance of software agent 112 is improved.

Information for cache file 200 in one embodiment may be generated by a software agent, such as agent 112, that will be accessing the database file. Further, a software agent may be optimized according to what cache information is available. Reducing the amount of database information that needs to be inspected and/or processed by use of the cache file in order for an application to complete a specific task may significantly improve application performance.

The use of query expressions to identify cached information allows the use of cache files with varying structures. The information subsets stored in a cache file need not adhere to any particular structure.

Although the embodiments described herein mention the use of one cache associated with a database file, other embodiments are possible that utilize more that one cache. Multiple cache files may be created to meet application and query requirements. Further, although the embodiments discussed herein utilize XML files, other embodiments are possible using other file types and/or database formats.

Figure 3:
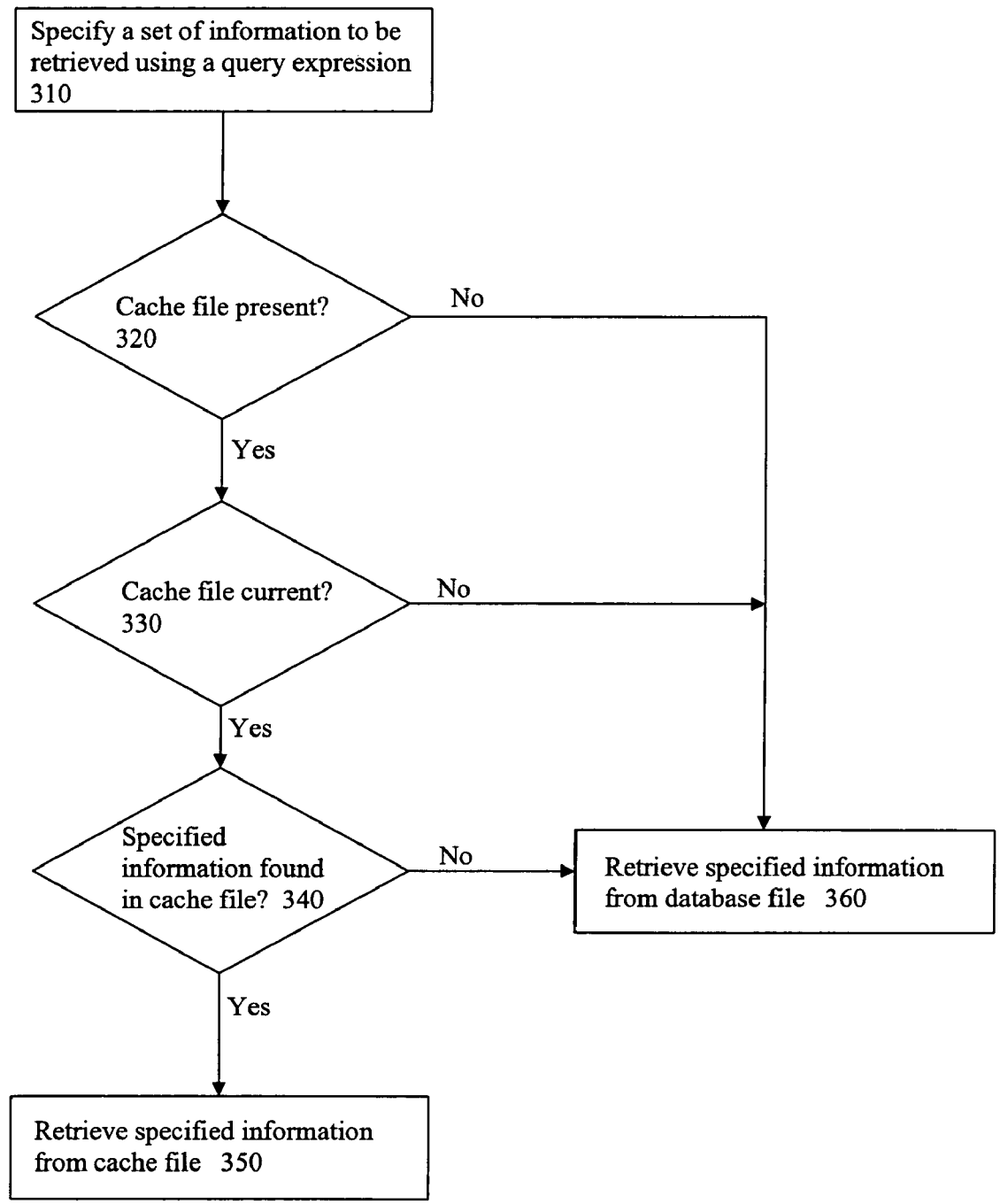
FIG. 3 is a flow diagram of one embodiment of a method for retrieving specified information from a cache file.

FIG. 3 is a flow diagram of one embodiment of a method for retrieving specified information from a cache file. The method of FIG. 3 may include all, more than all, and/or less than all of blocks 310-360, and furthermore the order of blocks 310-360 is merely an example order, and the scope of the claimed subject matter is not limited in this respect. At block 310, a set of information to be retrieved by a software agent is specified using a query expression. At block 320, the software agent determines whether a cache file is present. If no cache file is present, then the specified information is retrieved from a database file. If a cache file is present, then processing proceeds to block 330 where a determination is made as to whether the cache file is current. This determination may be made through examination of a currency token stored in or associated with the cache file. The currency token for this example may comprise a time stamp, a checksum value associated with the database file, a length value associated with the database file, and/or a hash code value associated with database file.

If the cache file is not current, at block 360 the specified information is retrieved from the database file. If the cache file is found to be current, at block 340 a determination is made as to whether the specified information is found in the cache file. To make this determination, a comparison may be made of the query specifying the information to be retrieved and the expressions stored in the cache file. If a match is found, at block 350 the specified information is retrieved from the cache file. Because the software agent did not need to inspect, process, and/or parse the database file to retrieve the specified information, the information is retrieved quicker and the performance of the software agent is improved.

Figure 4:
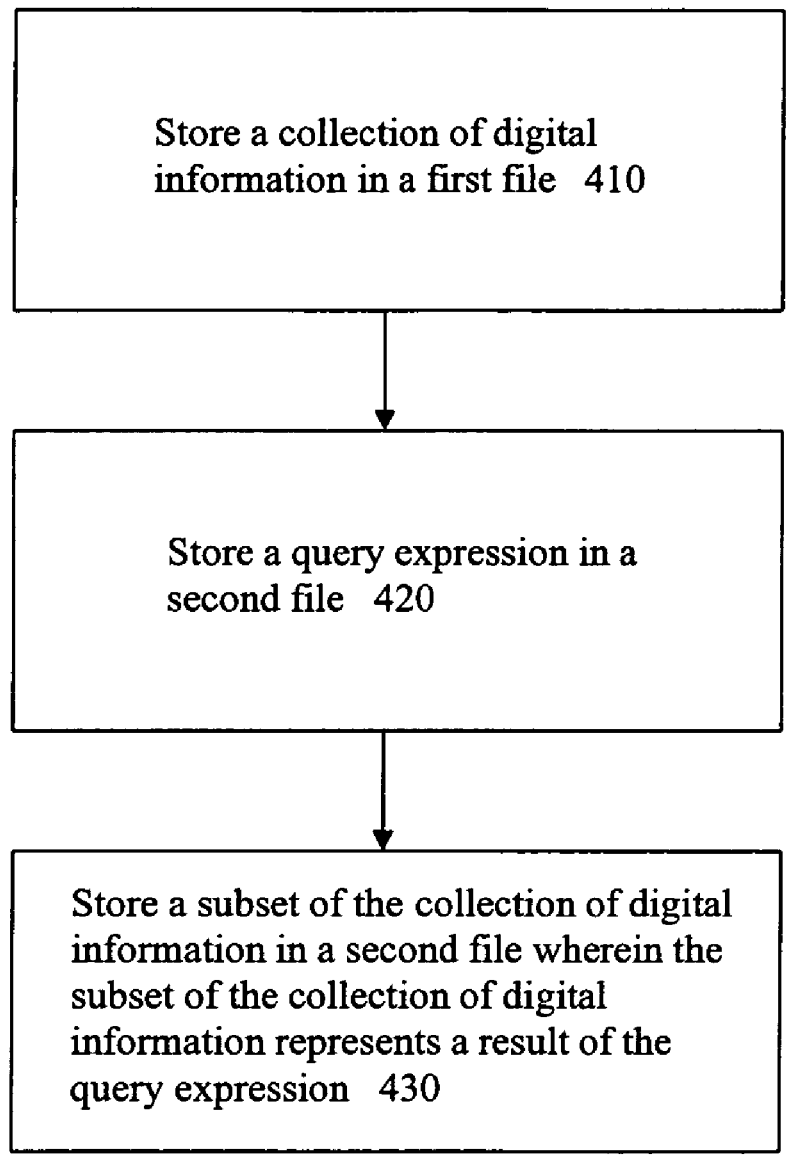
FIG. 4 is a flow diagram of one embodiment of a method for storing a subset of a collection of digital information in a cache file.

FIG. 4 is a flow diagram of one embodiment of a method for storing a subset of a collection of digital information in a cache file. The method of FIG. 4 may include all, more than all, and/or less than all of blocks 410-430, and furthermore the order of blocks 410-430 is merely an example order, and the scope of the claimed subject matter is not limited in this respect. At block 410, a collection of digital information is stored in a first file. The first file may comprise a database file, and may further comprise and XML file. At block 420, a query expression is stored in a second file. The second file may comprise a cache file and may further comprise for one embodiment an XML file. The query expression for one embodiment may comprise an) (Path or an XQuery expression. At block 430, a subset of the collection of digital information is stored in the second file. The subset of information may represent a result of the query expression. The subset of information may be associated with the stored query expression within the second file.

Figure 5:
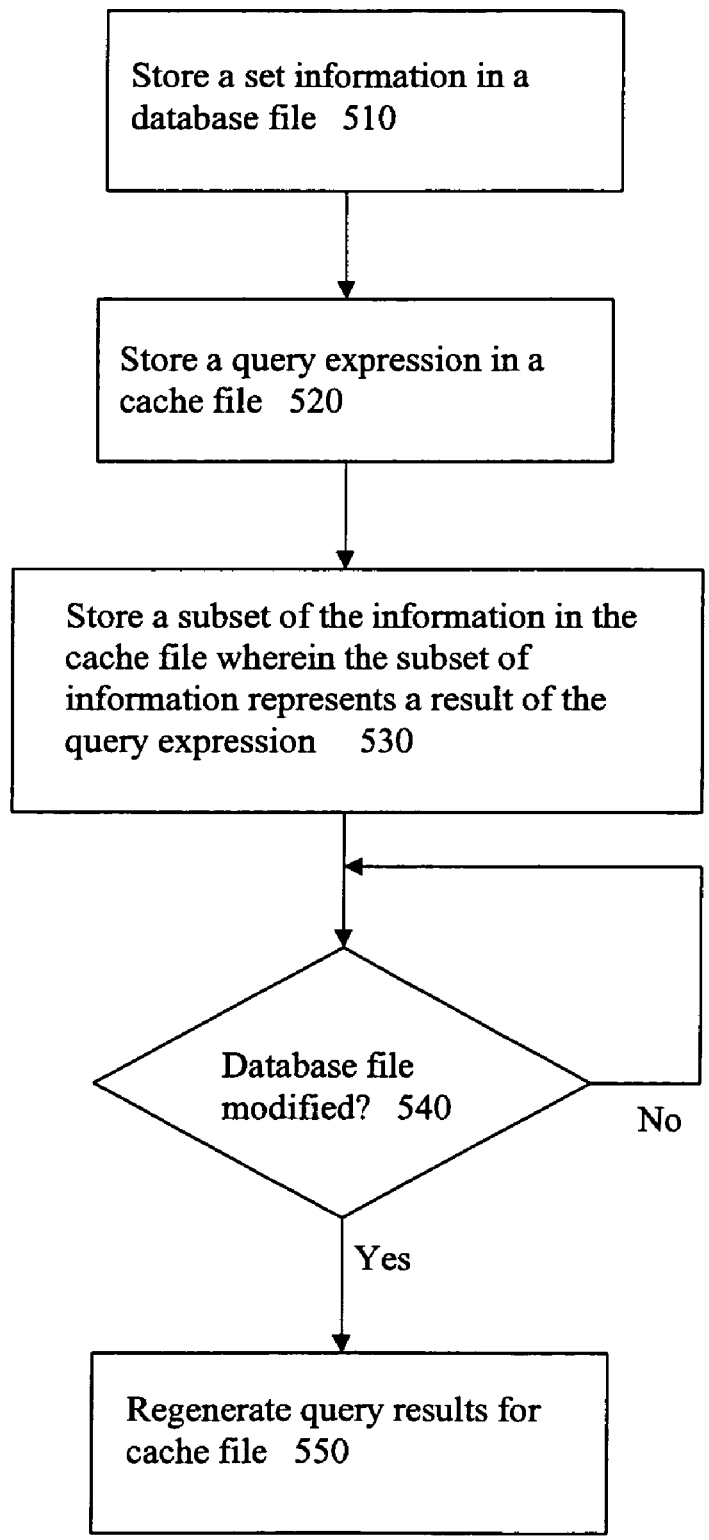
FIG. 5 is a flow diagram of one embodiment of a method for storing a subset of database information in a cache file.

FIG. 5 is a flow diagram of one embodiment of a method for storing a subset of database information in a cache file. At block 510, a set of information is stored in a database file. A query expression is stored in a cache file at block 520. At block 530, a subset of the information from the database file is stored in the cache file. The subset of information for this example represents a result of an evaluation of the query expression.

At block 540, a determination is made as to whether the database file has been modified. This determination may be made, at least is part, by examination of a currency token stored in the cache file. If the database file is found to have been modified, the query expression may be reevaluated and the subset of information may be thereby regenerated. Also if the database file is found to have been modified, the currency token may be updated.

For this example embodiment, the database file and the cache file may comprise XML files. The query expression may comprise an) (Path or XQuery expression. The currency token for this example may comprise a time stamp, a checksum value associated with the database file, a length value associated with database file, and/or a hash code value associated with database file. Other embodiments are possible using other file types, query expressions, and/or token types.

Figure 6:
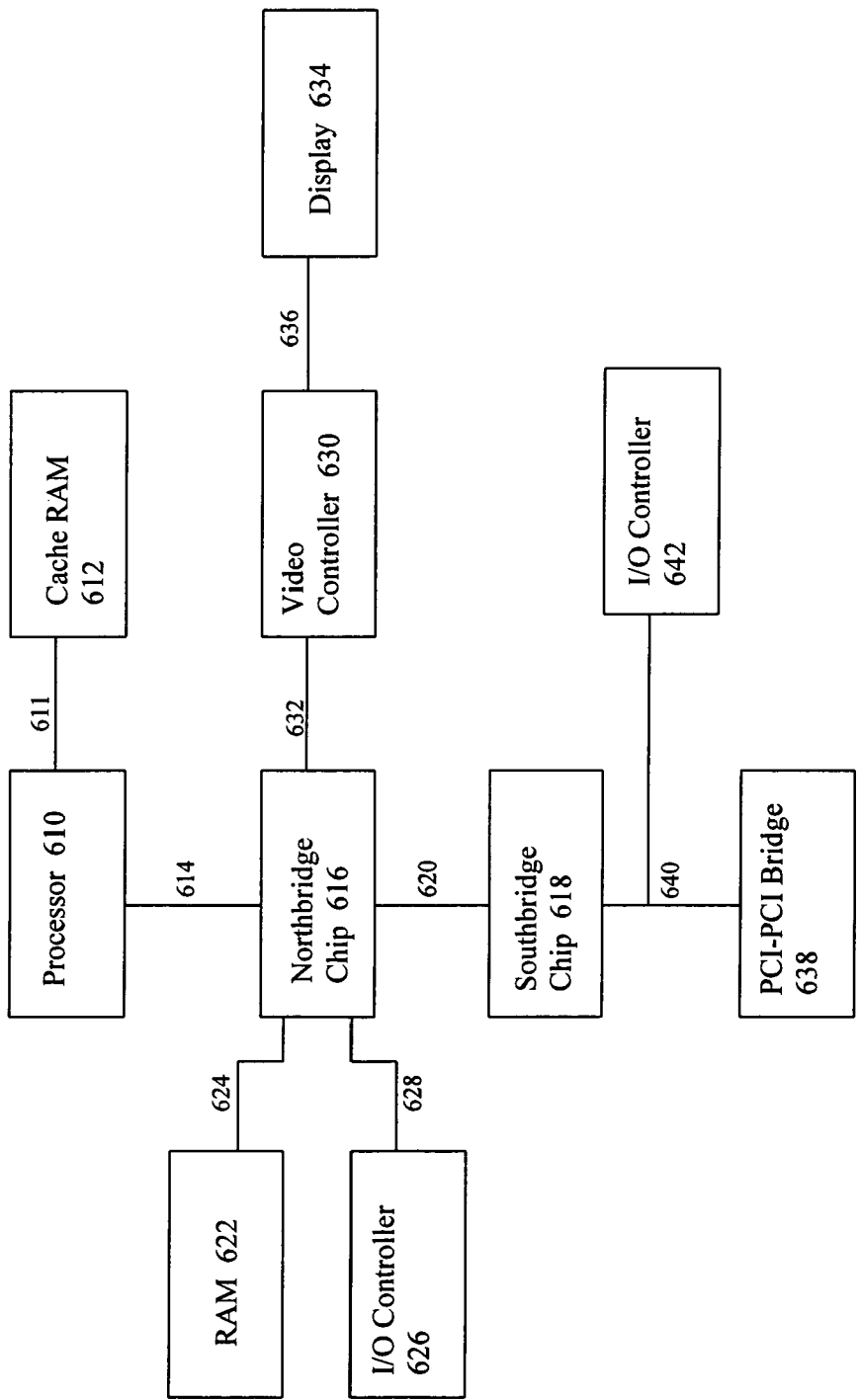
FIG. 6 is a block diagram of one embodiment of an example computer system.

Referring now to FIG. 6, a block diagram of a computing platform 600 in accordance with one or more embodiments will be discussed. Computing platform 600 may be programmed to store and/or access subsets of digital information stored in one or more cache files associated with one or more database files, as discussed above in connection with FIGS. 1 through 5, although the scope of the claimed subject matter is not limited in this respect. Computing platform 600 may also be programmed to create cache files such as those discussed above in connection with FIGS. 1 through 5. Computing platform 600 may include processor 610 coupled to cache random access memory (RAM) 612 via back side bus 611. Processor 610 may also couple to a chipset that includes Northbridge chip 616 via front side bus 614, and also to Southbridge chip 618 via bus 620. In one embodiment, Northbridge chip 616 in general may be utilized to connect a processor to memory, to an input/output bus, to a video bus, and to a Level 2 cache, although the scope of the claimed subject matter is not limited in this respect. In one embodiment, Southbridge chip 618 may be utilized to control input/output functions, the basic input/out system (BIOS), and interrupt control functions of Integrated Drive Electronics (IDE) devices such as hard disks or compact disk-read only memory (CD-ROM) devices or the like, although the scope of the claimed subject matter is not limited in this respect. Random access memory (RAM) 622 may couple to Northbridge chip 616 via main memory bus 624, and input/output (I/O) controller 626 may also couple to Northbridge chip 616 via I/O bus 628. In one embodiment, I/O controller 626 and I/O bus 628 may be in compliance with a Peripheral Component Interconnect (PCI) bus, although the scope of the claimed subject matter is not limited in this respect.

Video controller 630 may couple to Northbridge chip 616 via video bus 632 which in one embodiment may comprise an Accelerated Graphics Port (AGP) bus, although the scope of the claimed subject matter is not limited in this respect. Video controller 630 may provide video signals to and optionally coupled display 634 via display interface 636 which in one embodiment may comprise a Digital Visual Interface (DVI) in compliance with a standard promulgated by the Digital Display Working Group, although the scope of the claimed subject matter is not limited in this respect. Southbridge chip 618 may couple to a peripheral component interconnect to peripheral component interconnect (PCI-PCI) bridge 638 via input/output bus 640, which may in turn couple to I/O controller 642 to control various peripheral devices such as Universal Serial Bus (USB) devices, or devices compatible with an Institute of Electrical and Electronics Engineers (IEEE) 1394 specification, although the scope of the claimed subject matter is not limited in this respect.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method, comprising:
   storing a collection of digital information in a first file;
   storing a query expression in a cache file, wherein the query expression specifies a subset of digital information to be retrieved from the collection of digital information in the first file;
   retrieving the subset of digital information from the first file, wherein said retrieving comprises parsing the collection of digital information in the first file according to the query expression;
   storing a currency token in association with the cache file, wherein the currency token indicates whether the cache file is current;
   storing the retrieved subset of the collection of digital information in the cache file in association with the stored query expression; and
   wherein the currency token includes an attribute of the first file, and wherein the attribute describes the first file at a time when the collection of digital information stored in the first file is parsed to generate the subset of the collection of digital information which is stored in the cache file.

2. The method of claim 1, wherein said storing the collection of digital information comprises storing a plurality of entries in an XML format.

3. The method of claim 2, wherein said storing the query expression comprises storing an expression in an XQuery format.

4. The method of claim 2, wherein said storing a query expression comprises storing an expression in an XPath format.

5. The method of claim 1, wherein said storing the currency token comprises storing time stamp information associated with the first file.

6. The method of claim 1, wherein said storing the currency token comprises storing a checksum value associated with the first file.

7. The method of claim 1, wherein said storing the currency token comprises storing a length value associated with the first file.

8. The method of claim 1, wherein said storing the currency token comprises storing a hash code value associated with the first file.

9. The method of claim 1, further comprising:
modifying the collection of digital information in the first file; and
regenerating the subset of the collection of digital information in the cache file, wherein said regenerating comprises parsing the modified collection of digital information in the first file according to the query expression.

10. A method, comprising:
receiving a query expression specifying a set of information to be retrieved;
checking for the presence of a cache file related to a database file, the database file including at least the specified set of information, wherein the cache file comprises one or more subsets of information from the database file and one or more query expressions, wherein each one of the one or more subsets of information is stored in the cache file in association with a different one of the one or more query expressions, and wherein each one of the one or more subsets of information is a result of parsing the database file according to a corresponding one of the one or query expressions;
in response to determining that the cache file is present:
determining whether the specified set of information is present in the cache file;
in response to determining that the specified set of information is present in the cache file:
determining whether the cache file is valid, wherein said determining whether the cache file is valid comprises examining a currency token stored in association with the cache file, wherein the currency token indicates whether the cache file is current, wherein the currency token includes an attribute of the database file, and wherein the attribute describes the database file at a time when the database file was parsed according to the one or more query expressions that are stored in the cache file;
in response to determining that the cache file is valid:
retrieving the specified set of information from an entry in the cache file, wherein the entry is associated with one of the one or more query expressions which matches the retrieved query expression.

11. The method of claim 10, wherein said receiving the query expression comprises receiving one or more of an XQuery expression or an XPath expression.

12. The method of claim 10, wherein said determining whether the specified set of information is present in the cache file comprises determining whether the received query expression is present in the cache file.

13. The method of claim 10, further comprising retrieving the specified set of information from the database file if the cache file is not present or if the cache file is determined to be invalid.

14. The method of claim 10, further comprising retrieving the specified set of information from the database file if the specified set of information is not present in the cache file.

15. The method of claim 14, wherein said retrieving the specified set of information from the database file comprises parsing the database file according to the query expression.

16. An article, comprising: a machine-readable medium having stored thereon instructions that, if executed, direct a computing platform to:
store a collection of digital information in a first file;
store a query expression in a cache file, wherein the query expression specifies a subset of digital information to be retrieved from the collection of digital information in the first file;
retrieve the subset of digital information from the collection of digital information, wherein said retrieving comprises parsing the collection of digital information in the first file according to the query expression;
store a currency token in association with the cache file, wherein the currency token indicates whether the cache file is current;
store the retrieved subset of the collection of digital information in the cache file in association with the stored query expression; and
wherein the currency token includes an attribute of the first file, and wherein the attribute describes the first file at a time when the collection of digital information stored in the first file is parsed to generate the subset of the collection of digital information which is stored in the cache file.

17. The article of claim 16, wherein the machine-readable medium has stored thereon further instructions that, if executed, further direct the computing platform to store the collection of digital information by storing a plurality of entries in an XML format.

18. The article of claim 17, wherein the machine-readable medium has stored thereon further instructions that, if executed, further direct the computing platform to store the query expression in an XQuery format.

19. The article of claim 17, wherein the machine-readable medium has stored thereon further instructions that, if executed, further direct the computing platform to store the query expression in an XPath format.

20. The article of claim 16, wherein the machine-readable medium has stored thereon further instructions that, if executed, further direct the computing platform to store the currency token at least in part by storing time stamp information associated with the first file.

21. The article of claim 16, wherein the machine-readable medium has stored thereon further instructions that, if executed, further direct the computing platform to store the currency token at least in part by storing a checksum value associated with the first file.

22. The article of claim 16, wherein the machine-readable medium has stored thereon further instructions that, if executed, further direct the computing platform to store the currency token at least in part by storing a length value associated with the first file.

23. The article of claim 16, wherein the machine-readable medium has stored thereon further instructions that, if executed, further direct the computing platform to store the currency token at least in part by storing a hash code value associated with the first file.

24. The article of claim 16, wherein the machine-readable medium has stored thereon further instructions that, if executed, further direct the computing platform to:
modify the collection of digital information in the first file; and
regenerate the subset of the collection of digital information in the cache file, wherein said regenerating comprises parsing the modified collection of digital information in the first file according to the query expression.

25. An article, comprising:
a machine-readable medium having stored thereon instructions that, if executed, direct a computing platform to:
receive a query expression specifying a set of information to be retrieved;
check for the presence of a cache file related to a database file, the database file including at least the specified set of information, wherein the cache file comprises one or more subsets of information from the database file and one or more query expressions, wherein each one of the one or more subsets of information is stored in the cache file in association with a different one of the one or more query expressions, and wherein each one of the one or more subsets of information is a result of parsing the database file according to a corresponding one of the one or query expressions;
in response to determining that the cache file is present:
determine whether the specified set of information is present in the cache file;
in response to determining that the specified set of information is present in the cache file:
determine whether the cache file is valid, wherein said determining whether the cache file is valid comprises examining a currency token stored in association with the cache file, wherein the currency token indicates whether the cache file is current, wherein the currency token includes an attribute of the database file, and wherein the attribute describes the database file at a time when the database file was parsed according to the one or more query expressions that are stored in the cache file;
in response to determining that the cache file is valid:
retrieve the specified set of information from an entry in the cache file, wherein the entry is associated with one of the one or more query expressions which matches the retrieved query expression.

26. The article of claim 25, wherein the machine-readable medium has stored thereon further instructions that, if executed, further direct the computing platform to receive the query expression at least in part by receiving at least one of an XQuery expression or an XPath expression.

27. The article of claim 25, wherein the machine-readable medium has stored thereon further instructions that, if executed, further direct the computing platform to determine whether the specified set of information is present in the cache file at least in part by determining whether the received query expression is present in the cache file.

28. The article of claim 25, wherein the machine-readable medium has stored thereon further instructions that, if executed, further direct the computing platform to retrieve the specified set of information from the database file if the cache file is not present or if the cache file is determined to be invalid.

29. The article of claim 25, wherein the machine-readable medium has stored thereon further instructions that, if executed, further direct the computing platform to retrieve the specified set of information from the database file if the specified set of information is not present in the cache file.

30. The article of claim 29, wherein the machine-readable medium has stored thereon further instructions that, if executed, further direct the computing platform to retrieve the specified set of information from the database file, wherein said retrieving comprises parsing the database file according to the query expression.

31. An apparatus, comprising:
means for storing a collection of digital information in a first file;
means for storing a query expression in a cache file, wherein the query expression specifies a subset of digital information to be retrieved from the collection of digital information in the first file;
means for retrieving the subset of digital information from the collection of digital information in the first file, wherein said retrieving comprises parsing the collection of digital information in the first file according to the query expression;
means for storing a currency token in association with the cache file, wherein the currency token indicates whether the cache file is current;
means for storing the retrieved subset of the collection of digital information in the cache file, wherein the subset of the collection of digital information is stored in association with the stored query expression; and
wherein the currency token includes an attribute of the first file, and wherein the attribute describes the first file at a time when the collection of digital information stored in the first file is parsed to generate the subset of the collection of digital information which is stored in the cache file.

32. The apparatus of claim 31, wherein the means for storing the collection of digital information comprises means for storing a plurality of entries in an XML format.

33. The apparatus of claim 32, wherein the means for storing the query expression comprises means for storing the expression in an XQuery format.

34. The apparatus of claim 32, wherein the means for storing the query expression comprises means for storing the expression in an XPath format.

35. The apparatus of claim 31, further comprising:
means for modifying the collection of digital information in the first file; and
means for regenerating the subset of the collection of digital information in the cache file, wherein said means for regenerating comprises means for parsing the modified collection of digital information in the first file according to the query expression.

36. An apparatus, comprising:
means for receiving a query expression specifying a set of information to be retrieved;
means for checking for the presence of a cache file related to a database file, the database file including at least the specified set of information, wherein the cache file comprises one or more subsets of information from the database file and one or more query expressions, wherein each one of the one or more subsets of information is stored in the cache file in association with a different one of the one or more query expressions, and wherein each one of the one or more subsets of information is a result of parsing the database file according to a corresponding one of the one or query expressions;
means for, in response to determining that the cache file is present:
determining whether the specified set of information is present in the cache file;
means for, in response to determining that the specified set of information is present in the cache file;

determining whether the cache file is valid based, wherein said determining whether the cache file is valid comprises examining, on a currency token stored in association with the cache file, wherein the currency token indicates an attribute of the database file at a time when the database file was parsed according to one or more query expressions that are stored in the cache file;

means for, in response to determining that the cache file is valid:

retrieving the specified set of information from an entry in the cache file, wherein the entry is associated with one of the one or more query expression.

37. The apparatus of claim 36, wherein the means for determining whether the specified set of information is present in the cache file comprises means for determining whether the received query expression is present in the cache file.

38. The apparatus of claim 36, further comprising means for retrieving the specified set of information from the database file if the cache file is not present and/or if the cache file is determined to be invalid.

39. The apparatus of claim 38, further comprising means for retrieving the specified set of information from the database file if the specified set of information is not present in the cache file.

* * * * *